March 8, 1955  J. E. WATSON  2,703,435
APPARATUS FOR MOLDING ARTIFICIAL TEETH
Filed Sept. 15, 1949  2 Sheets-Sheet 1
FIG-1
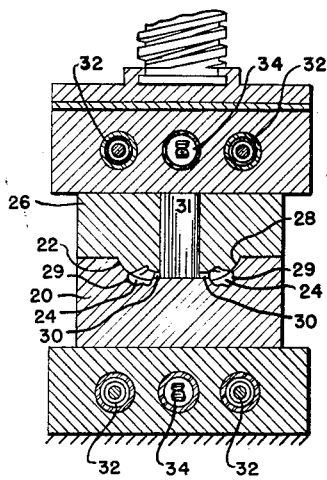
FIG-2
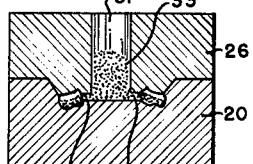
FIG-3
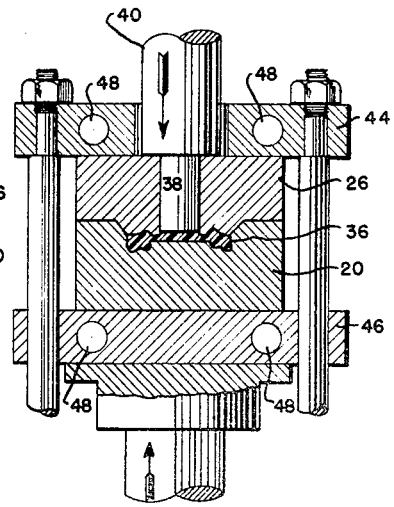
FIG-4  FIG-5  FIG-6
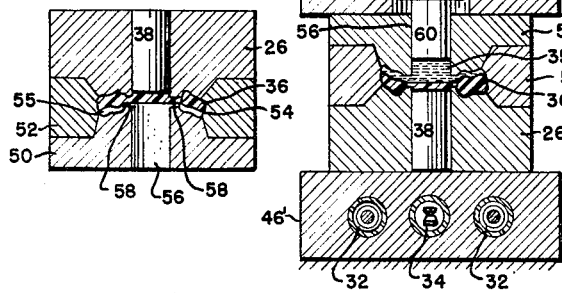 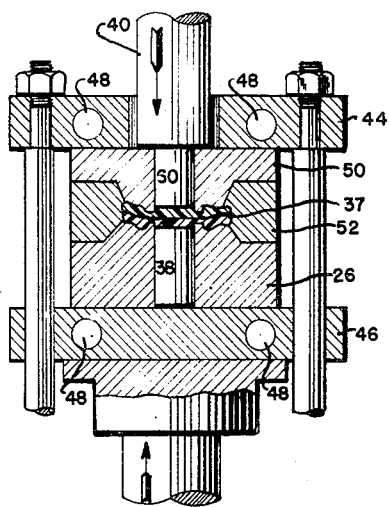
FIG-7
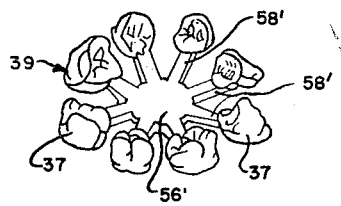
*INVENTOR.*
JOHN E. WATSON
BY
ATTORNEY March 8, 1955   J. E. WATSON   2,703,435
APPARATUS FOR MOLDING ARTIFICIAL TEETH
Filed Sept. 15, 1949   2 Sheets-Sheet 2
FIG-9
FIG-8
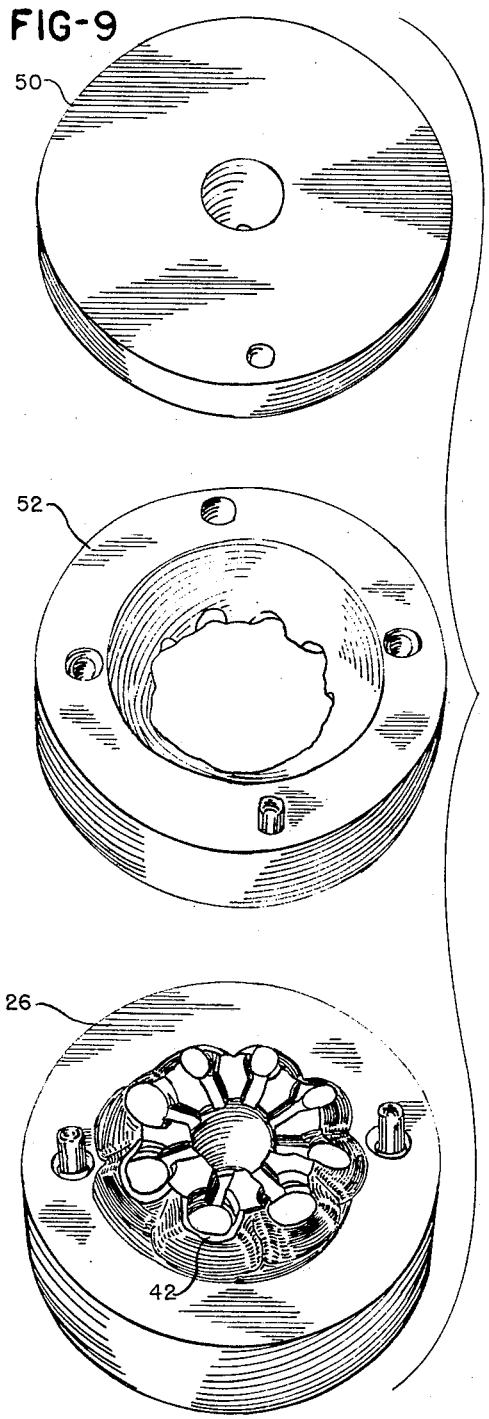
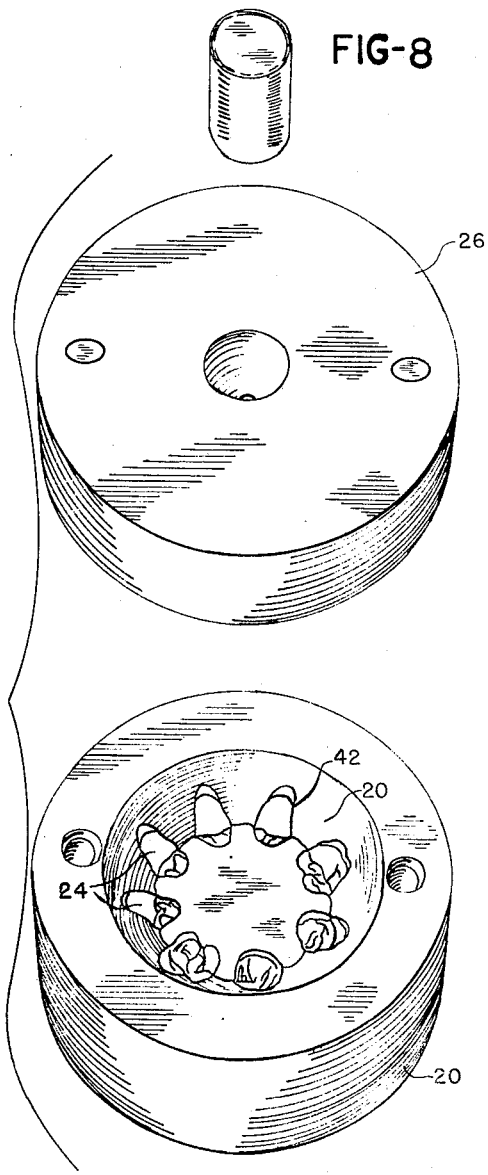
INVENTOR.
JOHN E. WATSON
BY
ATTORNEY United States Patent Office 2,703,435
Patented Mar. 8, 1955

2,703,435

APPARATUS FOR MOLDING ARTIFICIAL TEETH

John E. Watson, York, Pa., assignor to The Dentists' Supply Company of New York, New York, N. Y., a corporation of New York Application September 15, 1949, Serial No. 115,910

3 Claims. (Cl. 18—34.1)

This invention relates to apparatus for molding artificial teeth from synthetic plastic materials. The present application is a continuation-in-part of applicant's co-pending application S. N. 107,676 filed July 30, 1949, and entitled "Artificial Teeth, and Method and Apparatus for Forming the Same," now abandoned.

An object of the invention is to provide novel apparatus which, while not limited thereto, is particularly adapted for molding composite teeth from synthetic resin compositions such as are disclosed in applicant's co-pending application S. N. 103,046 filed July 5, 1949, entitled Artificial Teeth and Compositions, Methods and Apparatus for Forming the Same.

A further object is to provide a molding apparatus particularly adapted for forming the enamel portion of an artificial tooth from a synthetic resin gel or dough.

Another object is to provide improved means for the production manufacture of artificial teeth composed of separately molded dentine and enamel simulating materials, or body and enamel parts.

Other objects and advantages of the invention and a full understanding of the principles thereof will be apparent from the accompanying drawings and the following description of a presently preferred embodiment of the invention, in which:

Figure 1 is a transverse sectional view of the back part and the shader part of a tooth body mold constructed in accordance with the present invention, shown assembled and unloaded in a heater press.

Figure 2 is a transverse sectional view of the back mold part and the shader mold part of Figure 1, with the molding powder for forming the tooth body part in place in the heated mold.

Figure 3 is a transverse sectional view of the mold of Figure 2 shown in a cooling press and with pressure applied through a central plunger to the tooth body part resin.

Figure 4 is a view similar to Figure 3 but with the shader mold part removed and a 2-piece face mold part substituted therefor to form the finish mold, or the complete tooth mold.

Figure 5 is a transverse sectional view similar to Figure 4 but with the finish mold inverted and in place in a heater press, with tooth enamel part dough or gel in place in the mold beneath a central plunger which may be forced downwardly to press the dough or gel radially into the enamel portions of the mold cavities.

Figure 6 shows the mold of Figures 4 and 5 in a cooling press.

Figure 7 is a perspective view of a tooth cluster or "daisy" produced with the apparatus of Figures 1–6.

Figure 8 is an exploded perspective view of the back and shader mold parts and the central plunger shown in Figures 1 to 3.

Figure 9 is an exploded perspective view of the face and back mold parts of Figures 4–6, with the mold shown in the inverted position of Figures 5 and 6.

In applicant's co-pending application entitled Artificial Teeth and Compositions, Methods and Apparatus for Forming the Same, S. N. 103,046, filed July 5, 1949, a process and apparatus is disclosed which may be utilized for manufacturing an artificial tooth, and particularly the enamel simulating portion thereof, from a copolymer-forming moldable gel. The body or dentine simulating portion of the tooth is preferably formed of a resin material which differs in composition and properties from the resin which forms the face or tooth enamel simulating portion. The mold illustrated in the drawings of said co-pending application is of the conventional rectangular compression type utilizing a shader mold part for molding a tooth body, from a plastic material containing or comprising a thermoplastic resin to which the tooth face or enamel part is subsequently molded and bonded by compression molding of the thermosetting gel.

According to the present invention a novel mold is provided which is so formed and which may be so utilized as to simplify and speed up the molding process and to enable the molding operation to be done more rapidly, with less hand labor and with more uniform and consistently satisfactory results. While the mold of the present invention is particularly adapted for molding thermosetting enamel tooth parts (for instance enamel parts formed of the thermosetting copolymer resin disclosed in said co-pending application) over tooth body parts composed of a thermoplastic resin, the invention is not limited thereto but may be used with other materials, for instance with both enamel and body parts composed of thermoplastic acrylic resins.

Referring to the drawing, a mold is shown comprising at least 3 parts, all of which are circular and which may be assembled in alternative arrangements to provide: (1) a tooth body mold having a circular row of mold cavities for forming body tooth parts spaced circumferentially around a central well as in Figures 1 to 3, and (2) a complete tooth mold, or finish mold, having a like row of mold cavities for forming complete teeth and similarly arranged around a central well as in Figures 4 to 6.

Two of the mold parts are shown in the heater press in Figure 1. The lower or shader part 20 has a central concavity 22, the upper surface of which contains a ring of molding recesses 24 arranged in a circular series or row (in this case eight recesses), about the central axis of the cylindrical shader. The upper or back mold part 26 has a central boss 28 which fits into the concavity 22 and contains a ring of molding recesses also arranged in a circular series or row about the central axis of the cylindrical back part and which match and cooperate with the recesses of the mold part 20 to form a series of tooth body mold cavities 29, when the two parts are assembled as shown in Figure 1. These mold cavities are of exactly the shape and size desired for the body parts of the finished teeth (except for such provision as may be made for shrinkage, etc.) and are preferably of different configurations so as to respectively form the body parts of a complete set of eight posterior teeth, either uppers or lowers. Each mold cavity is connected by a gate 30 with a cylindrical loading reservoir or pressure chamber 31 extending through the face mold part 26 coaxially therewith.

In the first step of the presently preferred embodiment of the process as shown in the drawing, the shader and back mold parts are assembled in predetermined angular relationship with the aid of the guide holes and pins shown in Figure 8, and the mold is then heated to a predetermined temperature, for instance 350° F., in a heating press as shown in Figure 1. The heating press may be of conventional design, comprising opposed platens heated by electrical elements 32 to a constant temperture predetermined by a thermostatic device 34.

When the body mold has been heated to the required temperature it is removed from the press and immediately loaded (while hot) with a molding powder 33 such as methylmethacrylate (which might be, for instance, Du Pont's acrylic resin H. G. 22). The resin is poured or placed in chamber 31 as a finely divided powder which to some extent may flow or may be shaken or vibrated down into the molding cavities 29 through the gates or sprues 30, as shown in Figure 2. Of course these steps could be reversed, if desired, the mold being loaded with molding powder while cold and then heated. In either case the resin melts or softens in the hot mold to the stage in which it will form a unitary, homogeneous molded body when pressure is applied.

After the resin has been loaded in the reservoir and while the mold is still at a temperature of about 335° F. or more, it is placed in a cooling press as shown in Figure 3, a close fitting plunger 38 is inserted in the chamber or reservoir 31 and pressure (for example, from about 1500 to about 2000 p. s. i.) is immediately applied to the plunger by a piston 40, which may be operated by any convenient electrical, mechanical or hydraulic means (not shown). At the same time the mold parts are compressed and held in sealed engagement along the parting lines 42 around the mold cavities (see Figures 8 and 9) by the platens 44, 46 of the cooling press, and cold water or refrigerating liquid is circulated through the platen coolant passages 48. The force exerted by piston 40 on plunger 38 moves it downwardly, forces the resin 33 into the mold cavities through gates 30 and maintains the resulting cluster of tooth bodies 36 under compression while the mold is being cooled to a sufficiently low temperature, for instance about 220° F., to harden the molded or cured resin sufficiently to maintain its molded shape. The mold is then taken from the cooling press, the shader mold part 20 removed (the tooth body part 36 remaining in the back mold part) and replaced with the face mold part composed of the two sections 50, 52 as shown in Figure 4, the various parts being aligned by the guide pins and holes shown in Figure 9. The amount of resin placed in chamber 31 is carefully selected and measured so that when the plunger has been moved completely into the reservoir, with its top flush with the mold as in Figure 3, the resin will have filled the mold cavities and will be subjected to the desired molding pressure.

As will be seen from Figure 9, the two face mold parts 50, 52 when assembled as in Figure 4 are the same in shape and size as the shader mold part 20 of Figure 1, except that the molding recesses 54 of the face mold part are larger or deeper than those of the shader mold part, thereby providing a clearance space 55 between each tooth body part and the face mold part which corresponds in thickness and shape to the dimensions of the enamel or face part of the tooth. The face mold part, like the back part, also has a loading reservoir or pressure chamber 56 which extends coaxially therethrough and is connected through gates 58 with said clearance space in each mold cavity.

After the shader mold part is replaced with the face mold part as shown in Figure 4 the mold is inverted, and the enamel forming resin 35 is placed in the chamber 56. The resin may be added in the form of a viscid liquid or gel or dough which may flow or run down to some extent through the gates 58 into the clearance spaces 55 over or around each tooth body part in the respective mold cavities; in any case the enamel material is a flowable gelatinous or viscid liquid synthetic plastic that can be flowed like a fluid or liquid into the mold cavities when pressure is applied thereto as explained below.

Plunger 60 is then inserted in the cold mold and the assembly is placed in the heater press of Figure 5, wherein the mold is held closed and sealed at the parting lines around each mold cavity through compression exerted by the platens 44', 46'. At the same time pressure is applied (for instance about 1000 p. s. i. for the thermosetting copolymer resin of said co-pending application) to the viscous resin by forcing the closely fitting plunger downwardly by means of piston 40'. This causes resin 35 to flow into and completely fill the enamel mold spaces 55 and to be subjected therein to the hydrostatic pressure exerted in the resin by the plunger. Platens 44', 46' are then heated (or if they were already hot when the mold was inserted in the press the mold is merely left in place in the heater press for a sufficient time) until the mold reaches a temperature sufficient to complete the cure or setting of the enamel resin and to bond it inseparably to the preformed body material (for instance about 225° F. for the thermosetting resin of said co-pending application). Pressure is maintained continuously on the mold by platens 44', 46' and on the plunger by piston 40' during the curing cycle, and until the enamel material has become completely cured, inseparably bonded to the preformed tooth body part, and cooled. Cooling of the mold may be accomplished by moving it to a separate cooling press, as in Figure 6, or simply by discontinuing the heating and subsequently cooling the platens of the heater press. The resultant tooth cluster 39 (see Figure 7) is removed from the mold as a "daisy" of eight teeth 37 connected to the central sprue 56' by gates 58'. The teeth are clipped off the cluster by any suitable means and trimmed, finished and polished and carded for sale as completed articles of manufacture, ready for processing or attachment to a base or plate to form a denture. With plungers of the same diameter, as shown in Figure 6, either may be pushed on through the opposing mold half after the mold is removed from the cooling press to thereby knock out the central or sprue portion of the daisy or cluster and separate the teeth from each other.

With the above apparatus both the powder and the gel may be readily loaded, each in a single operation, into their respective pressure chambers, rather than being placed individually in the mold cavities as is the case in conventional compression tooth molding processes. Further, a complete set of body parts may be formed, left in place in one of the mold parts and the enamel tooth parts molded and bonded thereto to form a set of complete interconnected teeth which may then be removed from the mold as a unit or cluster. The material of both the body and enamel may be maintained under compression and hydraulic pressure continuously during the cooling cycle or during both the heating and cooling cycles, thus substantially eliminating heat marks, shrinkage effects, etc. Further, the enamel part of the tooth may be readily and easily molded from a viscid liquid resin or gel or dough, which enables more accurate and finer control of the placement, size and form of the enamel material, provides a less granular or non-granular structure and better color dispersion than would be the case if a conventional compression type mold and molding method were used. The circular or rotary mold arrangement assures greater efficiency with smaller mold size, low mold cost and more rapid mold heating and cooling as compared to a conventional rectangular compression type tooth mold. The ring arrangement of the mold cavities around a central pressurized sprue, to which they are connected by very short gates preferably of equal lengths, not only simplifies the loading operation and facilitates the replacement of the face mold part for the shader part without removal or displacement of the partially formed teeth from the back mold, but also insures that substantially equal hydraulic pressure is applied to the material in each mold cavity during the curing cycle and provides a cluster of completed teeth which may be removed from the mold and handled as a single article or unit.

The closed mold apparatus of the present invention offers many advantages as compared to conventional compression molding. There is less parting line flash when the mold halves are closed before the enamel gel or dough is forced in. The central pressure chamber not only affords easier and faster filling or loading, but it enables accurate control of the quantity of molding material provided per mold cavity to be obtained. Also, it insures a positive follow-up pressure which keeps the cavities full and compensates for curing and cooling shrinkage of the resin and which eliminates bubbles and heat or sink marks. There is less likelihood, with a closed mold filled or loaded through a central chamber, of entrapment of foreign matter or dirt in the molding material. Because there is less stress at the parting line with a closed mold than with a compression mold the molding material is less apt to be subjected to a non-uniform strain at this point, such as might cause subsequent distortion of the molded article. Use of the enamel dough or gel enables the enamel to flow and taper to a thin edge, giving more accurate control of the blend and providing an indistinguishable blend line, or line of jointure, where the enamel and body materials meet on the face of the tooth; also it insures the formation of a secure bond between the body and enamel materials.

A posterior tooth mold is shown in the drawings, for purposes of illustration; however, it will be understood that anterior teeth may be made according to the invention in a similar manner, merely by changing the form of the mold cavities.

In mass production molding it may not be expedient to accurately measure the quantity of powder 33 placed in the respective loading reservoir. For such purpose the piston 40 in Figure 3 may be made of smaller diameter than the plunger 38 thereby allowing the plunger to be pushed beyond its flush position, well into the chamber, until the pressure on the resin reaches the desired value. With such construction, a locking device (not shown) may be provided if desired in the back mold part 26 for securing the plunger in the position to which it has been forced after the body molding operation, so that the plunger may serve as a backing piece or stop for the sprue 56' during the enamel molding operation.

In the embodiment of the invention shown in the drawing pressure is applied by the central plunger to the body resin continuously from the beginning to the end of the cooling cycle and to the enamel resin continuously from prior to or at the beginning of the heating cycle to the end of the cooling cycle. However, the body resin may be also subjected to pressure continuously during both the heating and cooling cycles, if desired. Thus, the body resin, like the enamel resin may be loaded into its reservoir while the mold is cold and then heat and pressure may be simultaneously applied with a heating press and piston constructed as in Figure 5, having heating elements or a hot liquid in the platen passages, and the mold may then be cooled while maintaining pressure on the plunger and consequently on the body resin.

Though it is presently preferred to use an acrylic resin molding powder for the body material and a cross-linked copolymer resin gel (as disclosed in said co-pending application) for the enamel material other resins may be used as well. For instance the body resin might also be a cross-linked copolymer resin of the same composition as the enamel resin though of different color or pigmentation or it might be a monomer-polymer acrylic dough (for example a mixture or solution consisting of from about 25% to about 40% by weight methyl methacrylate monomer and from about 75% to about 60% methyl methacrylate polymer). Also the enamel resin may be an acrylic monomer-polymer gel or dough of the composition just stated, molded over a differently colored pre-formed body formed by the molding of either the acrylic monomer-polymer gel or dough or acrylic polymer powder. Whatever the resins used, it is found best according to the invention to first mold or pre-form the body and to cure it either partially or completely from a powder or gel or dough and to mold the enamel thereover and thereto as a gel or dough which is forced as a liquid into the mold cavities from the central pressure chamber and completely or finally cured therein while maintained under hydraulic pressure exerted by way of said chamber. Where an acrylic dough is used as the enamel material the pressure on plunger 60 should be somewhat higher than for the copolymer thermosetting enamel material. For example, plunger pressures of from about 1500 to 2000 p. s. i. are suitable for acrylic dough enamel material. Mold or curing temperatures of from about 200° F. to 250° F. are suitable for the acrylic dough.

It is to be understood that the invention is not limited to the specific embodiment or the preferred form herein specifically illustrated and described, but may be used in other ways without departure from its spirit as defined by the following claims.

I claim:

1. A tooth mold assembly comprising in combination a back mold part having a substantially central and cylindrical loading reservoir extending therethrough, a shader mold part, said back and shader mold parts also having complementary mold cavities disposed generally ring-like around said central reservoir and one of said mold parts having substantially radially extending gating passages extending between said reservoir and the mold cavities in said mold part, and a face mold part having a substantially central loading reservoir extending therethrough and a ring-like set of mold cavities surrounding said aperture and complementary to said mold cavities in said back mold part when said back and face mold parts are assembled but in conjunction therewith defining larger cavities than those formed when said back and shader mold parts are assembled, said face mold part also having substantially radial gating pasages extending between the central reservoir and each mold cavity therein and the loading reservoirs in said back and face mold parts substantially being in axial alignment.

2. The mold assembly set forth in claim 1 further including a substantially cylindrical plunger closely fitting and removably insertable within the central reservoir of said back mold part and operable to support the central portion of a cluster of molded tooth parts while performing subsequent molding operations when the face mold part is assembled with said back mold part.

3. The mold assembly set forth in claim 1 further characterized by said face mold part comprising a plurality of interfitting members each having partial mold cavities therein cooperable with each other and the mold cavities in said back mold part to form complete mold cavities, one of said interfitting members being annular and said back and face mold parts having projections insertable into and interfitting with surfaces of said annular member to interposition said parts therewith.

References Cited in the file of this patent

UNITED STATES PATENTS

| | | |
|---|---|---|
| 1,129,336 | Critcherson | Feb. 23, 1915 |
| 2,230,164 | Myerson | Jan. 28, 1941 |
| 2,345,305 | Thornton | Mar. 28, 1944 |
| 2,359,152 | Pryor et al. | Sept. 26, 1944 |
| 2,420,570 | Shapiro | May 13, 1947 |
| 2,454,847 | Slack | Nov. 30, 1948 |
| 2,554,845 | Thornton | May 29, 1951 |